US005933924A

United States Patent [19]

Nowlen

[11] Patent Number: 5,933,924

[45] Date of Patent: Aug. 10, 1999

[54] POWER LINE INSULATOR CLAMP

[76] Inventor: William M. Nowlen, 11575 Pole Cat Rd., Missoula, Mont. 59802

[21] Appl. No.: 08/853,793

[22] Filed: May 9, 1997

[51] Int. Cl.[6] ............................ F16G 11/00; H01B 17/00

[52] U.S. Cl. .................................. 24/132 R; 24/132 WL; 24/335

[58] Field of Search .......................... 24/132 R, 132 WL, 24/335; 174/169

[56] References Cited

U.S. PATENT DOCUMENTS

| | | | |
|---|---|---|---|
| 1,667,332 | 4/1928 | Stahler | 81/3.8 |
| 1,744,356 | 1/1930 | Bodendieck | 81/53.1 |
| 1,840,150 | 1/1932 | Bodendieck | 81/3.8 |
| 1,853,598 | 4/1932 | Birkenmaier | 81/3.8 |
| 1,853,599 | 4/1932 | Birkenmaier | 81/3.8 |
| 1,912,519 | 6/1933 | Freebury | 81/53.2 |
| 1,994,938 | 3/1935 | Bott . | |
| 2,448,402 | 8/1948 | Thompson | 269/249 |
| 2,726,694 | 12/1955 | Saxton | 239/240 |
| 2,779,366 | 1/1957 | McKenzie | 269/246 |
| 2,966,817 | 1/1961 | Wengen | 81/53.1 |
| 2,986,053 | 5/1961 | Atman et al. | 81/53.1 |
| 3,674,916 | 7/1972 | Langella | 174/169 |
| 4,105,358 | 8/1978 | Walker | 408/108 |
| 4,434,978 | 3/1984 | Kloster | 269/239 |
| 4,470,328 | 9/1984 | Landis | 81/53.1 |
| 4,579,306 | 4/1986 | Kellett et al. . | |
| 4,965,930 | 10/1990 | Wnukowski | 81/53.1 |
| 5,286,211 | 2/1994 | McIntosh | 439/100 |

*Primary Examiner*—Victor N. Sakran
*Attorney, Agent, or Firm*—Dowrey & Associates

[57] ABSTRACT

A power line insulator clamp for clamping a power line to the top of a power line-holding insulator which comprises first and second clamping members pivotally hinged together by a hinge connection. The first clamping member has a first section configured to extend from the hinge connection across the top of the insulator so as to overlay a power line groove on the top of the insulator, and a second section configured to extend transversely of the first section for engaging a tie wire groove on the insulator. The second clamping member has a third section configured to extend from the hinge connection transversely of the first section for engaging the tie wire groove on the insulator. The hinge connection is located to one side of the clamp so as to not interfere with the insulator or a power line extended across the insulator. An actuator is coupled to the first and second clamping members for opening and closing the clamp.

11 Claims, 4 Drawing Sheets

Fig. 5
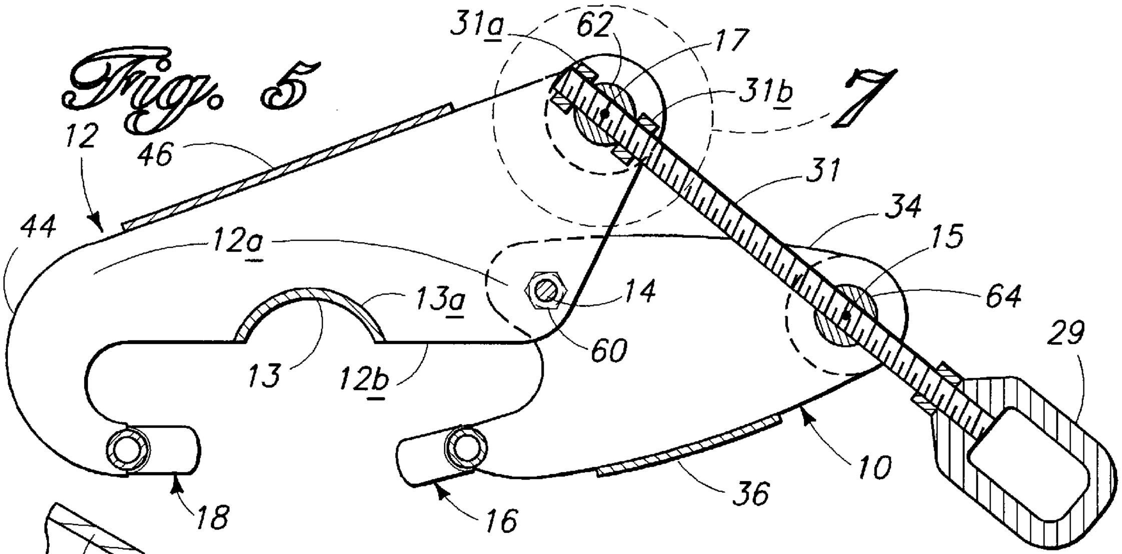
Fig. 7
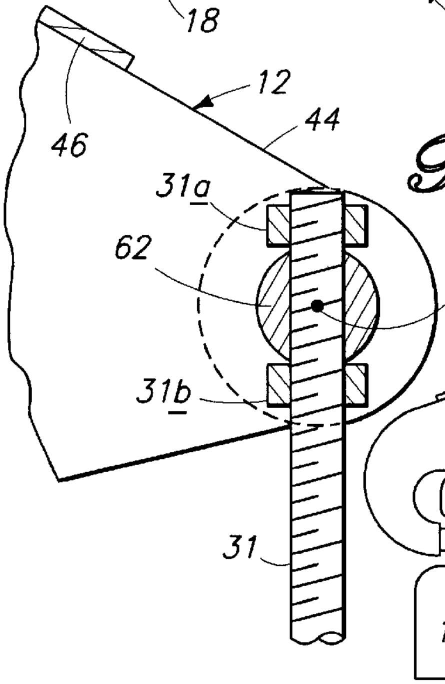
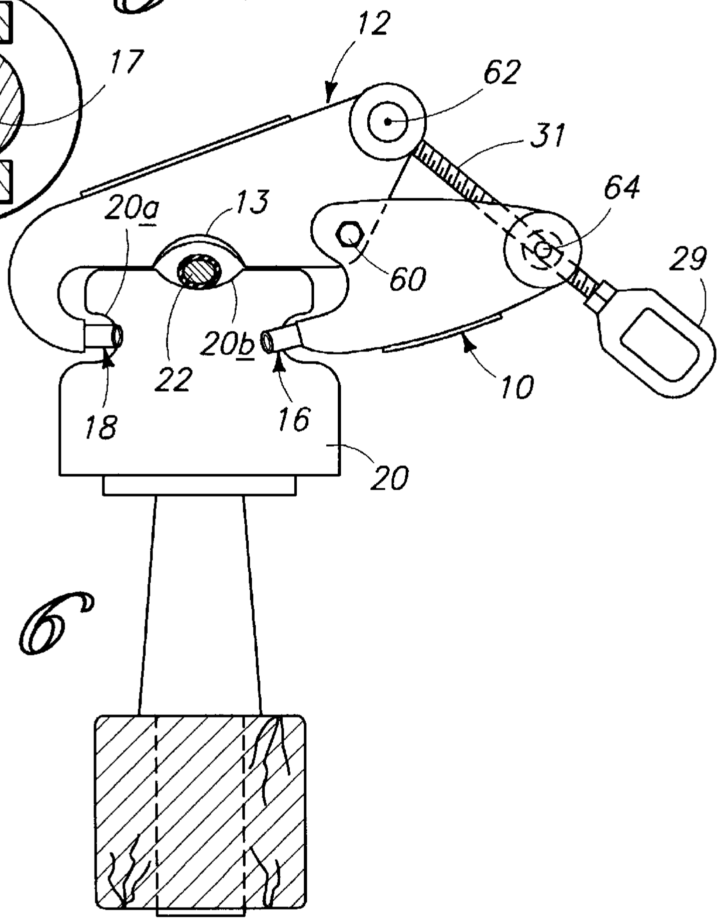
Fig. 6

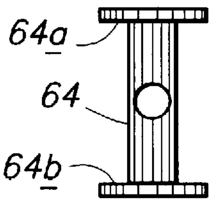
Fig. 8
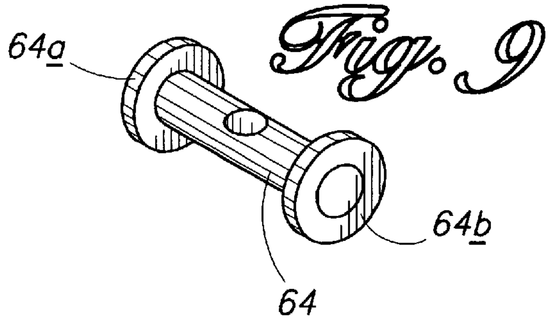
Fig. 9
Fig. 10
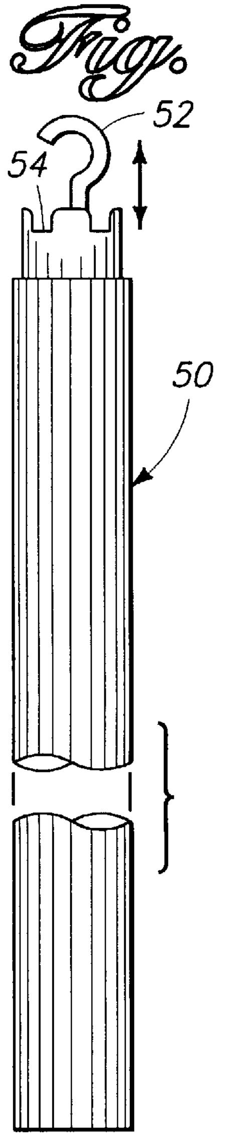
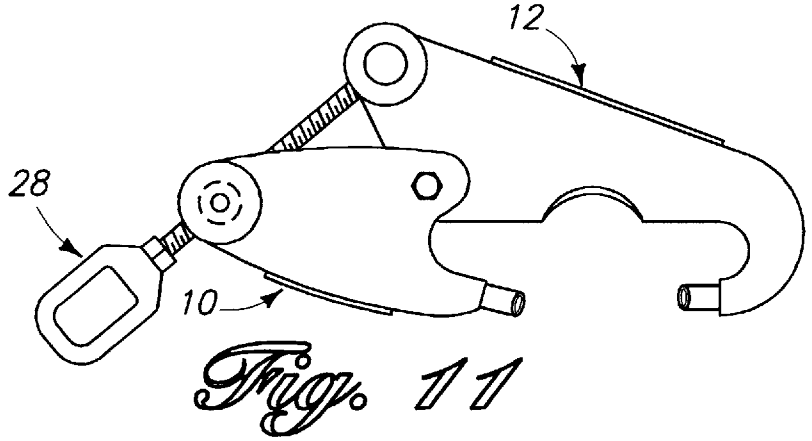
Fig. 11

POWER LINE INSULATOR CLAMP

BACKGROUND OF THE INVENTION

1. Field of the Invention

This invention relates to clamps and, more particularly, to clamps for attachment to power line insulators to hold a power line on the clamped insulator.

2. Brief Description of the Prior Art

Power lines are often strung between pole-mounted insulators of the type having a concave groove across the top of the insulator. Such insulators, made of porcelain or glass typically, are formed to provide an annular groove around the side of the insulator body for holding power line tie wires in addition to the groove across the top of the insulator. The power lines are extended across the insulators in the grooves and secured thereto by tie wires that encircle both the line and the insulator. Whenever the sag in a power line must be adjusted to adjust the belly in the line, the tie wires must be removed from the line so that the line can move freely in the top grooves of the insulators. When the power line has been released from being secured to the insulators, linemen have difficulty maintaining the position of the power line in the top grooves of the insulators.

SUMMARY OF THE INVENTION

A primary object of the present invention is to provide a power line insulator clamp that can be mounted on a power line insulator and prevent the power line from becoming dislodged from the insulator top groove. Another object of the present invention is to provide such a clamp that permits the captured power line to slide in the insulator top groove during a sag adjusting operation. A further object is to provide such a clamp that can be installed and removed from a power line insulator from a distance.

These objects and advantages will become apparent from the following description of the invention.

In accordance with these objects and advantages, the invention comprises a power line insulator clamp for clamping a power line to the top of a power line-holding insulator wherein first and second clamping means are pivotally hinged together by hinge means, the first clamping means being configured to extend from the hinge means across the top of the insulator so as to overlay a power line groove on the top of the insulator and to engage a tie wire groove on the insulator, and the second clamping means being configured to extend from the hinge means to engage the tie wire groove on the insulator. The hinge means is located to one side of the clamp so as to not interfere with the insulator or a power line extended across the insulator. Actuating means is coupled to the first and second clamping means to open and close the clamp about the insulator.

BRIEF DESCRIPTION OF THE DRAWINGS

FIG. 5 is a vertical cross-section view taken along the line 5—5 in FIG. 1;

FIG. 6 is a vertical elevation view of the FIG. 1 clamp installed on a power line insulator with a power line loosely confined by the clamp in the insulator top groove;

FIG. 7 is an enlarged detail view taken from the area indicated in FIG. 5;

FIG. 8 illustrates one of the fittings of the FIG. 1 clamp;

FIG. 9, is a perspective view of the FIG. 8 fitting;

FIG. 10 is a side elevation view of a clamp adjusting tool suitable for use with the FIG. 1 clamp;

FIG. 11 illustrates the FIG. 1 clamp in an open condition, prior to being attached to an insulator;

DESCRIPTION OF THE PREFERRED EMBODIMENT

The power line insulator clamp for clamping a power line to the top of a power line-holding insulator, according to the present invention comprises first and second clamping members pivotally hinged together by a hinge connection. The first clamping member has a first section configured to extend from the hinge connection across the top of the insulator so as to overlay a power line groove on the top of the insulator, and a second section configured to extend transversely of the first section for engaging a tie wire groove on the insulator. The second clamping member has a third section configured to extend from the hinge connection transversely of the first section for engaging the tie wire groove on the insulator. The hinge connection is located to one side of the clamp so as to not interfere with the insulator or a power line extended across the insulator. An actuator is coupled to the first and second clamping members for opening and closing the clamp.

Figure 12:
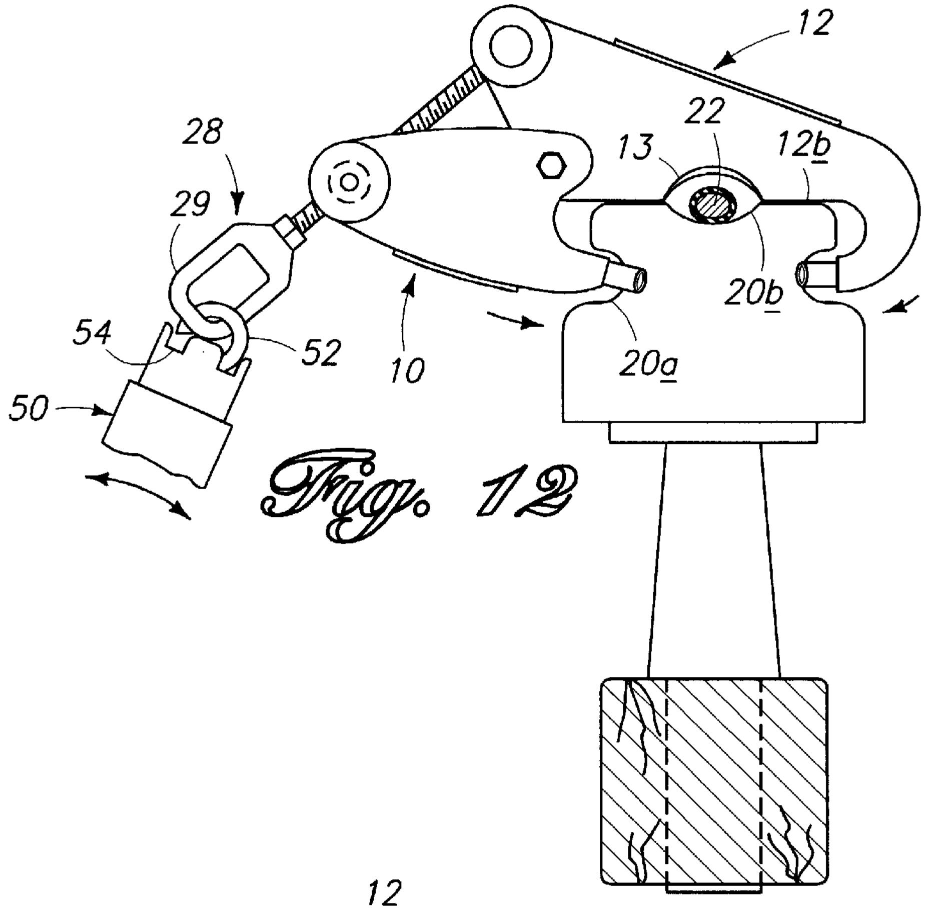
FIG. 12 illustrates the FIG. 1 clamp applied to an insulator and closed so as to confine a power line in the insulator top groove and with the FIG. 10 tool applied to the lamp so as to secure the clamp to the insulator; any
Figure 13:
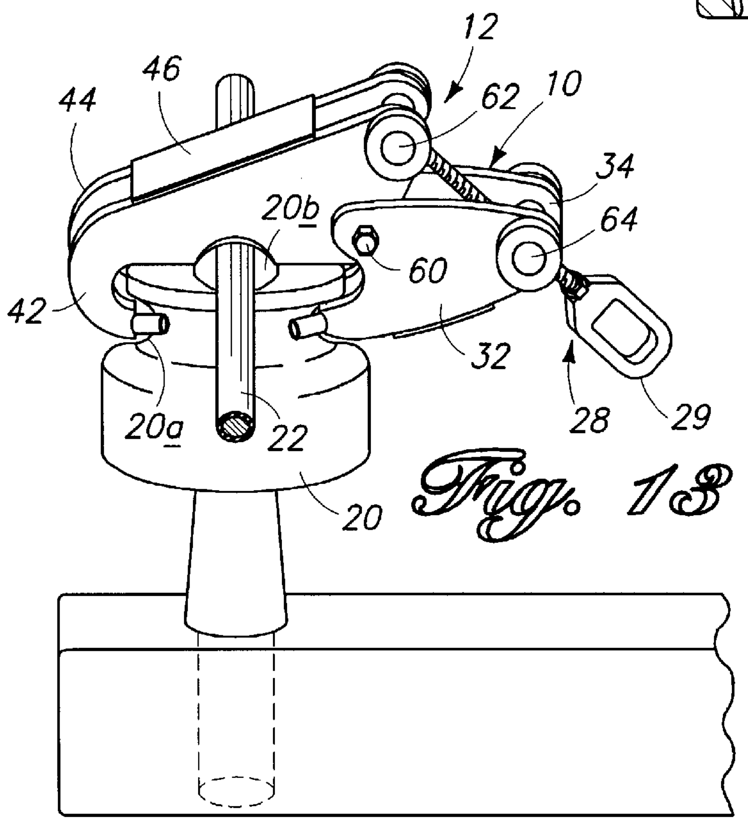
FIG. 13 is a perspective view of the FIG. 1 clamp applied to an insulator so as to confine a power line in the insulator top groove.

The power line insulator clamp of this invention comprises a pair of clamp members 10, 12, a lever-actuating member 28, and insulator-engaging members 16, 18. The clamp members 10, 12 are pivotally connected together at a pivot connection point by a hinge connection, as at 14, so that insulator-engaging members 16, 18 can be brought into and out of engagement with a pin-type power line insulator 20 as a consequence of pivotal movement of the clamp members 10, 12. One of the clamp members, member 12, is configured to extend across the top of an insulator 20, and the portion indicated at 12*a* that extends across the top of the insulator is provided with a concave channel 13 positioned to overlay a power line 22 when the clamp is applied to a power line-holding insulator. This general arrangement is shown particularly in FIGS. 6, 12 and 13. The hinge connection, with the pivot connection point 14, between the two clamp members 10, 12 is located to one side as shown so that it does not interfere with either the insulator 20 or the power line 22. The opposing clamp member 10 depends from the pivot connection point 14 so that its insulator-engaging member 16 is juxtaposed opposite the insulator-engaging member 18 of clamp member 12 when the clamp is applied to an insulator 20, such as is seen in FIGS. 6, 12 and 13.

Each clamp member, 10 and 12, is configured to provide an actuating lever arm, indicated at 24 and 26, respectively, The lever-actuating member 28 is pivotally connected to the clamp member lever arms, levers 24, 26, at pivot connection points 15 and 17, respectively, and is adjustably connected to at least one of the lever arms so that its operation will effect a pivoting of the levers 24, 26 so as to cause the clamp members 10, 12 to close and open. The length of the lever arms is determined by the distance between the pivot connection points 14–15 and 14–17, respectively for levers 24 and 26. As shown in the drawings, the lever-actuating member 28 is adjustably connected to lever 24. In particular, the actuating member 28 is rotatably mounted to lever 26 at pivot connection point 17 and threadedly mounted to lever 24 at pivot connection point 15 such that the turning of actuating member 28 will cause the threaded mounting at pivot connection point 15 of lever 24 to track up and down actuating member 28 thereby respectively opening and closing clamp members 10 and 12.

Figure 2:
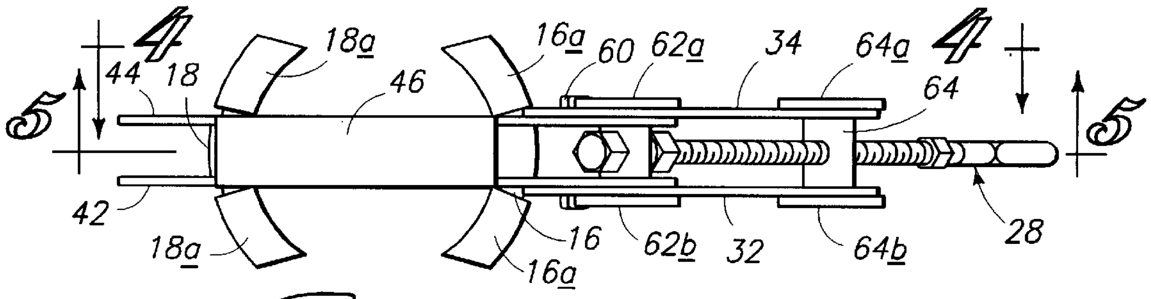
FIG. 2 is a top plan view of the FIG. 1 clamp.
Figure 1:
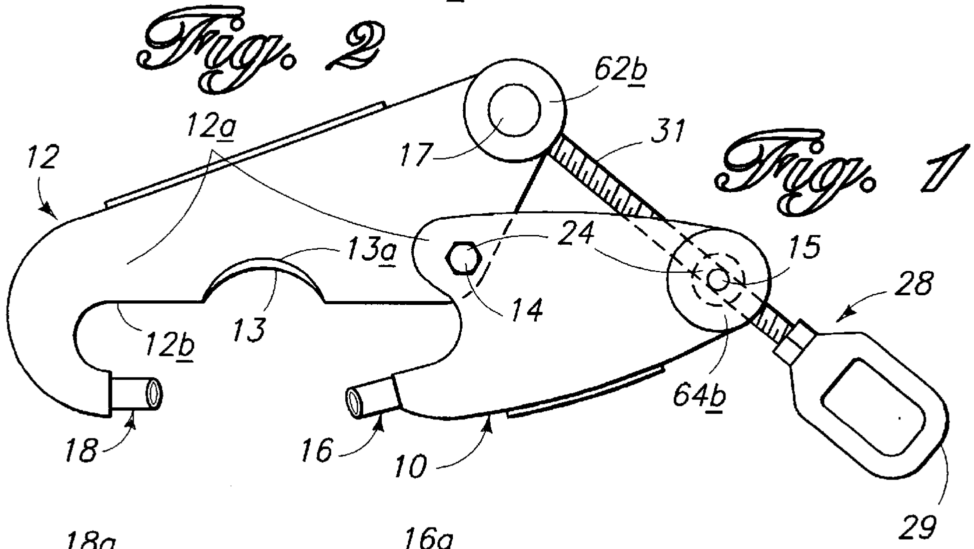
FIG. 1 is a side elevation view of a preferred embodiment of the power line insulator clamp of this invention.
Figure 3:
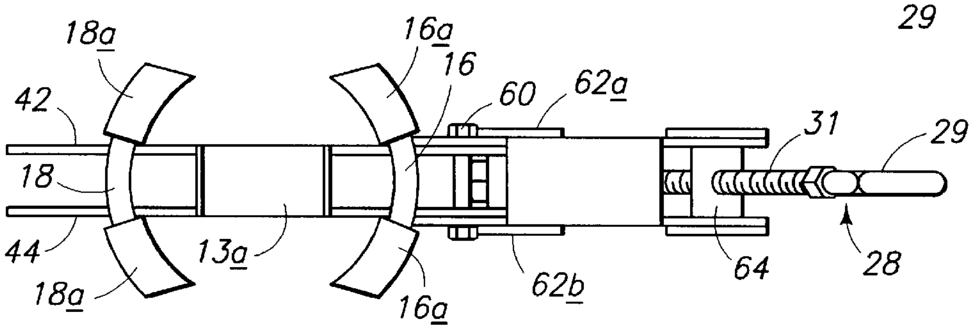
FIG. 3 is a bottom plan view of the FIG. 1 clamp.
Figure 4:
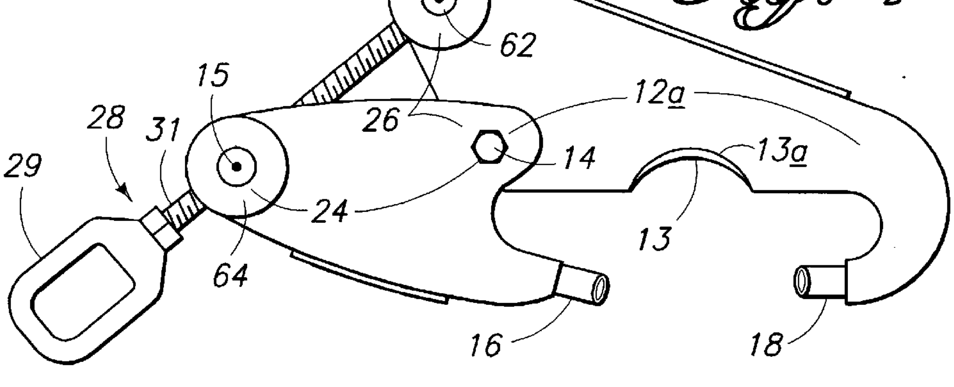
FIG. 4 is an opposite side elevation view of the FIG. 1 clamp.

The clamp members 10, 12 may be formed by any one of a number of techniques, so long as the functional relationship of the various parts is maintained. As shown in the drawings, the clamp members 10, 12 are fabricated from thin metal plates so as to comprise side members and edge members so that they are roughly channel-shaped. With respect to clamp member 10, the member has two side members 32, 34 and one edge member 36 (seen in FIGS. 1–3, 5, 7 and 13). With respect to clamp member 12, the member has two side members 42, 44 and one edge member 46 (seen in FIGS. 1–3,5 and 13). The three pieces of each clamp member may be formed from one metal piece, as by stamping for example, or formed by welding the three pieces together. Alternately, the three pieces of each clamp member could be formed of plastic, as by injection molding for example. The arcuate channel 13 in clamp member 12 could be provided by configuring the side members 42, 44 so as to yield the concave shape shown in FIG. 1, for example, or alternately, in addition a concave channel member 13_a_ could be mounted to the concave portions of the side members 42, 44 so as to extend across the width of the clamp member 12 as seen in FIG. 3.

Insulator-engaging members 16, 18 may be formed integral with the clamp members 10, 12, respectively, or they may be separate, discrete pieces that are attached to the clamp members. As seen in the drawings, the insulator-engaging members 16, 18 are provided as curved metal rods that are attached to their respective clamp members, as by welding. The ends of the insulator-engaging members are encased in tubular cushioning sleeves 16_a_, 18_a_, made of suitable material such as plastic tubing.

The clamp members 10, 12 and their respective insulator-engaging members 16, 18 and lever-actuating member 28 are configured so that the power line insulator clamp of this invention can be installed on an insulator from below with an elongated installation tool 50 as seen in FIG. 12. The installation tool 50 comprises a hook 52 that can be attached to the end 29 of lever-actuating member 28 as shown. The tool 50 is adjustable so that hook 52 can be retracted so as to engage lever-actuating member end 29 in slots 54 whereby the tool 50 is locked onto the end 29. With the tool 50 locked onto the end 29, the tool can maneuver the device so as to place the clamp member 12 over an insulator 20 with its insulator-engaging member 18 inserted in the insulator's side annular groove 20_a_ and so that its concave channel 13 overlies a power line 22 as seen in FIGS. 6, 12 and 13. The tool can then be turned, thereby turning lever-actuating member 28, to draw the other clamp member 10 toward the insulator 20 and its insulator-engaging member 16 into the insulator side groove 20_a_ until the insulator is clamped between the insulator-engaging members 16, 18. The configuration of the clamp member 12 is such that the concave channel 13 is located in portion 12_a_ midway between the insulator-engaging members 16, 18 when the device is in its clamped or closed condition as seen in FIGS. 6, 12 to and 13, so as end up centered over the insulator 20 and over the insulator's power line channel 20_b_. The concave channel 13 is configured so that it does not clamp the power line 22 within channel 20_b_ so that power line 22 can move through the channel 20_b_. The clamp member 12 is also configured so that its lower side edges, as at 12_b_, closely overlies the top of the insulator 20 so that the power line 22 cannot escape the power line channel 20_b_ or become wedged between the clamp members and the insulator.

The two clamp members 10, 12 are pivotally hinged together by a pivot pin 60 that extends through both clamp members. Both clamp members are provided with aligned apertures through their respective side members, 32,34 and 42,44 respectively, through which pin 60 is extended. Clamp member 10 is configured so the portions of its side members that contain the pivot pin apertures overlap side members of clamp member 12 so that their respective pivot pin apertures can be aligned for receipt of the pivot pin 60. The axis of pivot pin 60 coincides with pivot connection point 14. Pivot pin 60 is shown as a bolt with its head on one end and a fastening nut on the other end. As shown, clamp member 12 extends between the side members of clamp member 10. The configurations of clamp members 10 and 12 could be changed so that clamp member 10 would fit between the side members of clamp member 12.

The lever-actuating member 28 is pivotally hinged to clamp member 12 by a pivot pin 62 that extends through the side members of clamp member 12 above pivot pin 60. Clamp member 12 is provided with aligned apertures through its side members 42, 44 through which pin 62 is extended. Pivot pin 62 is provided with a bore that extends diametrically through its shank and lever-actuating member 28 is extended through the bore and secured such that it cannot fall out but so that it can turn within the bore of pin. 62. Pivot pin 62 is shown as a cylindrical rod that extends through the sides of clamp member 12 and is fastened to end collars 62_a_, 62_b_ so that pin 62 can rotate within the aligned apertures in the sides of clamp member 12. The axis of pivot pin 62 coincides with pivot connection point 17. Lever-actuating member 28 comprises a threaded shank portion 31 and a handle 29. If the threaded shank portion 31 extends to the end as shown in the drawings, the shank 31 can be secured to pin 62 by upper and lower locking nuts 31_a_, 31_b_ that are threaded onto shank 31 and butted against pin 62 as shown in FIGS. 5 and 7.

The lever-actuating member 28 is pivotally hinged to clamp member 10 by a pivot pin 64 that extends through the side members of clamp member 10 below pivot pin 60. Clamp member 10 is provided with aligned apertures through its side members 32, 34 through which pin 64 is extended. Pivot pin 64 is provided with a bore that extends diametrically through its shank and lever-actuating member 28 is extended into the bore and secured therein. Pivot pin 64 is shown as a cylindrical rod that extends through the sides of clamp member 12 and is fastened to end collars 64_a_, 64_b_ so that pin 64 can rotate within the aligned apertures in the sides of clamp member 10. The axis of pivot pin 62 coincides with pivot connection point 15. The bore through pin 64 is internally threaded. Likewise, the shank 28_a_ of the lever-actuating member 28 is threaded and is screwed into and through the threaded bore of pin 64. Therefore, when the handle 29 of the lever-actuating member 28 is grasped and rotated, the resultant rotation of the threaded shank 31 will cause pin 64 to track up and down and, thereby, effect the opening and closing of clamp member 10 relative to the insulator 20.

The clamp arm 12 should sit on the upper part of the insulator groove 20*a* so that, as the clamp closes, it will ride down into the groove and therefore insure that there is no gap between the clamp arm 12 and the top of the insulator. When installing the clamp, using a pole installer such as shown at 50, the clamp will typically dangle down from the hook 52 so that the clamp will be hung across the power line 32 so that clamp arm 12 will first engage the insulator groove 20*a*. Then, as the pole 50 is lowered, the clamp will swing down over the power line 32 so that clamp arm 10 engages the insulator groove 20*a*. As the clamp is closed about the insulator 20, the clamp arm 10 will naturally close into the groove 20*a*, with clamp arm 12 being brought down to the top of the insulator so that the power line 32 cannot ride out of its groove 20*b* and become jammed between the insulator and the clamp.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. For use with a power line-holding insulator having a transverse power line groove in an end surface of the body thereof and an associated annular tie wire groove in the body adjacent thereto, a power line insulator clamp for loosely confining a power line in the power line groove comprising;

first and second clamping members pivotally hinged together by a hinge connection, the first clamping member having a first section configured to extend from the hinge connection across the end surface of the insulator so as to transversely overlay the power line groove, and a second section configured to extend transversely of said first section for engaging said tie wire groove on one side of the insulator, the second clamping member having a third section configured to extend from the hinge connection transversely of the first section for engaging the tie wire groove on the opposite side of the insulator, the hinge connection being located to one side of the clamp remote from said power line groove so as not to interfere with the insulator or a power line located within said power line groove, and an actuator coupled to the first and second clamping members for opening and closing the clamp.

2. The clamp of claim 1 wherein; said first clamping member has a groove-engaging element at an outer end of the second section thereof, said second clamping member has a groove-engaging element at an outer end of the third section thereof, both said groove-engaging elements being configured to engage a portion of the annular tie wire groove.

3. The clamp of claim 1 wherein;

the first clamping member comprises two side members joined together by an edge member so as to form a unitary form, and the second clamping member comprises two side members joined together by an edge member so as to form a unitary form, said hinge connection being formed by pivotally connecting overlapping portions of the first clamping member side members and the second clamping member side members.

4. The clamp of claim 1 wherein the first section of the first clamping member has a concave arcuate portion opening downward so as to overlay the insulator power line groove.

5. The clamp of claim 4 wherein; the first clamping member comprises two side members joined together by an edge member so as to form a unitary form, the second clamping member comprises two side members joined together by an edge member so as to form a unitary form, said hinge connection being formed by pivotally connecting overlapping portions of the first clamping member side members and the second clamping member side members, and said first clamping member further comprising an arcuate member extending across the bottom edges of the first clamping member side members, the arcuate member providing the concave arcuate portion.

6. The clamp of claim 5 wherein;

the actuator comprises a screw shaft pivotally connected to the first member side members by a cross shaft, said screw shaft being pivotally connected to the second member side members by a threaded cross shaft.

7. A clamp for confining a power line in a power line groove in the top of a power line-holding insulator having tie wire grooves, said clamp comprising;

first and second clamping members pivotally connected together by a hinge, said first clamping member being configured to extend from the hinge across the top of the insulator so as to overlay said power line groove and to engage a tie wire groove in one side of the insulator, the second clamping member being configured to extend from the hinge to engage a tie wire groove on the opposite side of the insulator, the hinge being located to one side of the clamp so as not to interfere with the insulator or a power line located in said power line groove, and an actuator coupled to the first and second clamping members to open and close the clamp about the insulator.

8. The clamp of claim 7 wherein the first clamping member has a first clamping arm for engaging a tie wire groove; and wherein the second clamping member has a second clamping arm for engaging a tie wire groove.

9. The clamp of claim 8 wherein the first clamping member has a first lever arm coupled to said hinge; wherein the second clamping member has a second lever arm coupled to said hinge, the two lever arms being configured so that operation of said actuator will cause the first and second clamping arms to open and close about the insulator.

10. The clamp of claim 9 wherein the actuator includes a screw shaft pivotally connected to the first lever arm at a first pivot connection so that the screw shaft pivots with respect to the first lever arm when the clamp is opened and closed; and wherein the screw shaft is pivotally connected to the second lever arm at a second pivot connection so that the screw shaft pivots with respect to the second lever arm when the clamp is opened and closed, and wherein the screw shaft is axially moveable through the second pivot connection to open and close the clamp.

11. The clamp of claim 8 wherein the first clamping arm includes a concave arcuate portion facing downward at a location to overlay the power line groove.

* * * * *